No. 678,972. Patented July 23, 1901.
J. G. NOLEN.
TELEPHONE TRANSMITTER.
(Application filed Apr. 11, 1901.)
(No Model.)
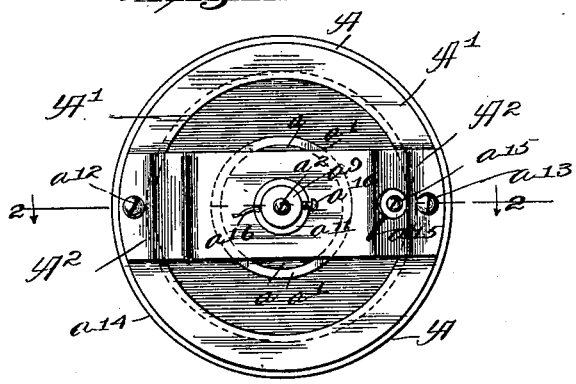
Witnesses
Ray White
Harry R. White
Inventor
James G. Nolen
By Jones Bain
Attorney.

UNITED STATES PATENT OFFICE.

JAMES G. NOLEN, OF CHICAGO, ILLINOIS.

TELEPHONE-TRANSMITTER.

SPECIFICATION forming part of Letters Patent No. 678,972, dated July 23, 1901.

Application filed April 11, 1901. Serial No. 55,335. (No model.)

*To all whom it may concern:*

Be it known that I, JAMES G. NOLEN, a citizen of the United States, residing at Chicago, county of Cook, and State of Illinois, have invented certain new and useful Improvements in Telephone-Transmitters; and I do hereby declare the following to be a full, clear, and exact description of the invention, such as will enable persons skilled in the art to which it appertains to make and use the same.

One object of my invention is to provide a telephone-transmitter which is very sensitive, efficient, and durable in operation and in which the resisting medium, comprising the finely-divided carbon, is held in a state of stress, by means of which a practically constant normal resistance is provided and by which the normal resistance may be quickly and easily varied by a slight turn of a nut, attended with very little friction when the instrument is in operation.

A further object of my invention is to provide a means by which a stress is placed upon the diaphragm, so as to render it extremely sensitive and responsive to the voice-waves that impinge against it at the time when conversation is being transmitted by its operation.

In the drawings, Figure 1 is a view of the back of the instrument. Fig. 2 is a section through lines 2 2 of Fig. 1. Fig. 3 represents the diaphragm and the cup for containing the finely-divided resistance medium.

In all of the drawings the same letters of reference indicate similar parts.

A is an exteriorly-threaded ring. A' is a ring of slightly smaller diameter, adapted to hold the diaphragm in place on said threaded ring in contact with the outer circumferential edges thereof.

Screws $a^{12}$ and $a^{13}$ are adapted to be placed through perforations in the yoke-piece $A^2$ and to hold the said yoke in fixed relation with said ring.

$a$ is a cup for containing the finely-divided material which composes the resisting medium of the transmitter. This cup I prefer to make of glass and cast the threads around the outside thereof and the perforations in the bottom at the time the glass is molded.

$a^2$ is a stem connected to the electrode $a^3$. This electrode, in the form of a plunger or disk, is preferably composed partially of carbon, or it may be made of some non-oxidizable metal fixed to the stem $a^2$, or it may be an integral part of the said stem.

$a^3$ is a carbon-electrode disk adapted to fit against the rear interior wall of the cap $a'$. This cap is preferably made of brass and is adapted to be screwed over the cup or case $a$.

$a^5$ is a curved sheet-metal four-armed spring adapted to be placed on the inside of the cup or case $a$ and to exert a pressure against the plunger-electrode $a^3$, tending to force the case on the stem $a^2$. A similar spring $a^6$ is adapted to be placed around the stem $a^2$ on the outside of the case $a$ and to draw the case $a$ in the opposite direction to that exerted by the spring $a^5$, so that the case $a$ and diaphragm $a^8$ will by the opposing tension of both springs be held in a state of delicate equilibrium. This condition may be adjusted by varying the relative strength of the springs.

$a^{17}$ is a nut adapted to be screwed over the end of the stem $a^2$ when the parts are assembled.

$a^8$ is the ordinary diaphragm of a telephone-transmitter, adapted to be attached to the cap $a'$ by means of the screw $a^7$.

$a^9$ is an interiorly-threaded bushing, into which the stem $a^2$ of the plunger $a^3$ is adapted to project. $a^{10}$ is a screw to fasten and hold the stem $a^2$ in position in the said bushing.

$a^{11}$ is an insulated bushing for insulating $a^9$ from the bridge $A^2$.

$a^{14}$ is a thread cut on the outside circumference of the ring A for the purpose of attaching the ordinary mouthpiece and cap to this my telephone-transmitter unit.

$a^{15}$ and $a^{16}$ are the electrical terminals of the instrument.

When the instrument is assembled, as shown in Fig. 2, the tension of the springs $a^5$ and $a^6$ may be regulated by tightening or loosening the nut $a^{17}$ on the stem $a^2$, and by this means the case and diaphragm will be held in a state of delicate equilibrium. By tightening the nut $a^{17}$ and increasing the tension upon the spring $a^6$ the diaphragm $a^8$ may be shoved outwardly and elastically held or maintained under a tension, which renders the instrument exceedingly delicate and sensitive to the effect of the voice-waves that impinge against the diaphragm $a^8$. It will be noticed that the diaphragm carries the cap $a'$ and the cup or case $a$ and all that is contained therein, with the exception of the stationary plunger $a^3$ and the stem $a^2$. Therefore the granulated finely-divided resisting material which is contained between the plunger $a^3$ and the electrode $a^4$ of the cap $a'$ is bodily moved and vibrated when the diaphragm is set in motion.

My instrument is susceptible of two adjustments, which may be made after it has been assembled ready for operation. First, by moving the stem $a^2$ in the bushing $a^9$ and by tightening set-screw $a^{10}$; second, by moving the nut $a^{17}$ along the stem $a^2$ to compress the springs $a^5$ and $a^6$. Both or either of these adjustments may be made to effect the stress or condition of the diaphragm $a^8$ and the condition of the granular medium between the said electrodes.

The result of the construction just described is to produce an instrument of an extraordinary sensitive nature and one that may be cheaply constructed, quickly assembled, adjusted to the most minute variations, and very durable in its operation. The double spring, for the purpose described, in conjunction with the diaphragm $a^8$, renders this instrument a very durable, yet an exceedingly sensitive and responsive apparatus. These springs may be unequally powerful.

I have shown sheet-metal springs having four arms each; but it is evident that helically-coiled wire springs may be used in lieu of this form of spring without departing from the spirit and gist of my invention.

The mode of operation will be apparent from the foregoing description and drawings to those skilled in the art.

Having described my invention, what I claim as useful, and desire to secure by Letters Patent of the United States, is—

1. A telephone-transmitter comprising a diaphragm, a case carried by said diaphragm, an electrode in said case adapted to move therewith, an opposing, fixed electrode in said case, carried upon a stem passing through a perforation in said case, a resistance-varying material between said electrodes, and springs adapted to exert a pressure to move the case in opposite directions, substantially as set forth.

2. A telephone-transmitter comprising a diaphragm, a case carried by said diaphragm, an electrode in said case adapted to move therewith, an opposing, fixed electrode in said case, a resistance-varying material between said electrodes, counteracting-springs adapted to exert a pressure to move the case in opposite directions, and a means for adjusting said springs, substantially as set forth.

3. A telephone-transmitter comprising a diaphragm, a case carried by said diaphragm, an electrode in said case adapted to move therewith, an opposing, fixed electrode, in said case, carried upon a stem passing through a perforation in said case, a resistance-varying material between said electrodes, a spring between the fixed electrode and the rear wall of said case, a nut on the stem carrying the fixed electrode, and a counteracting-spring between said nut and said case, substantially as set forth.

In testimony whereof I have signed this specification, in the presence of two susbcribing witnesses, this 27th day of February, A. D. 1901.

JAMES G. NOLEN.

Witnesses:
FORÉE BAIN,
M. F. ALLEN.